United States Patent
Iqbal et al.

(10) Patent No.: US 11,726,034 B2
(45) Date of Patent: Aug. 15, 2023

(54) IR SPECTRA MATCHING METHODS

(71) Applicant: Missouri State University, Springfield, MO (US)

(72) Inventors: Razib Iqbal, Springfield, MO (US); Keiichi Yoshimatsu, Springfield, MO (US); Joshua Ellis, Springfield, MO (US)

(73) Assignee: MISSOURI STATE UNIVERSITY, Springfield, MO (US)

(\*) Notice: Subject to any disclaimer, the term of this patent is extended or adjusted under 35 U.S.C. 154(b) by 489 days.

(21) Appl. No.: 16/811,680

(22) Filed: Mar. 6, 2020

(65) Prior Publication Data

US 2020/0284719 A1  Sep. 10, 2020

Related U.S. Application Data

(60) Provisional application No. 62/815,093, filed on Mar. 7, 2019.

(51) Int. Cl.
*G01N 21/35* (2014.01)
*G01N 21/31* (2006.01)

(52) U.S. Cl.
CPC ..... *G01N 21/35* (2013.01); *G01N 2021/3196* (2013.01); *G01N 2021/3595* (2013.01)

(58) Field of Classification Search
CPC .......... G01N 21/35; G01N 2021/3196; G01N 2021/3595; G01J 3/28
See application file for complete search history.

(56) References Cited

U.S. PATENT DOCUMENTS 4,642,778 A * 2/1987 Hieftje ............... G01N 21/3577
  702/23
4,987,548 A * 1/1991 Saito ..................... G01N 21/35
  702/28

(Continued)

FOREIGN PATENT DOCUMENTS

JP  2015526135 A * 9/2015 ............... A61B 1/00

OTHER PUBLICATIONS

Varmuza, P. Prenchev, K. Scsibrany, Maximum common substructures of organic compounds exhibiting similar infrared spectra, J. Chem. Inf. Model. 38 (1998) 420-427.

(Continued)

*Primary Examiner* — Mohamed K Amara
(74) *Attorney, Agent, or Firm* — Kulak Rock LLP; Brian L. Main (57) ABSTRACT

Spectra matching is widely used in various applications including the search for a spectrum of an unknown or subject material, chemical, or compound in an existing spectral database and quality control by means of comparing the spectra of products with standards. New systems and methods are described for identifying an unknown compound by calculating the similarities of Fourier-transform infrared (FTIR) spectra of organic compounds. The systems and methods incrementally calculate the spectral similarity based on the local spectral shapes. This reduces the bias caused by uneven weighing of large or broader peaks. In addition, the new systems and methods tolerant to the common issues in spectra matching including baseline offset, baseline sloping, and deviations in wavenumber axis alignment, suggesting its robustness and practical applicability.

17 Claims, 5 Drawing Sheets

(56) References Cited

U.S. PATENT DOCUMENTS

| | | | | |
|---|---|---|---|---|
| 5,121,337 | A * | 6/1992 | Brown | G01N 21/3504 702/28 |
| 5,311,445 | A * | 5/1994 | White | G01J 3/28 702/28 |
| 5,448,070 | A * | 9/1995 | Day | G01J 3/28 250/339.13 |
| 5,545,895 | A * | 8/1996 | Wright | G01N 21/274 250/252.1 |
| 6,662,116 | B2 | 12/2003 | Brown | |
| 6,697,654 | B2 * | 2/2004 | Lorenz | G01N 21/4785 250/341.8 |
| 6,711,537 | B1 * | 3/2004 | Beaucoup | G10L 19/012 704/219 |
| 6,800,855 | B1 * | 10/2004 | Dong | G01N 21/39 250/339.13 |
| 6,816,743 | B2 | 11/2004 | Moreno et al. | |
| 7,009,533 | B1 * | 3/2006 | Wegener | H04N 1/413 341/87 |
| 7,072,770 | B1 * | 7/2006 | Schweitzer | G16C 20/20 702/22 |
| 9,057,689 | B2 * | 6/2015 | Soller | G01N 21/3577 |
| 9,759,835 | B2 | 9/2017 | Zhang et al. | |
| 11,353,439 | B2 * | 6/2022 | Prystupa | G01N 21/94 |
| 2008/0084553 | A1 * | 4/2008 | Neiss | G01N 21/65 356/51 |
| 2015/0071036 | A1 * | 3/2015 | Yang | G01N 29/11 367/25 |
| 2020/0116564 | A1 | 4/2020 | Goldring et al. | |

OTHER PUBLICATIONS

Varmuza, M. Karlovits, W. Demuth, Spectral similarity versus structural similarity: infrared spectroscopy, Anal. Chim. Acta 490 (2003) 313-324.

Li, D. Hibbert, S. Fuller, G. Vaughn, A comparative study of point-to-point algorithms for spectra, Chemometr. Intell. Lab. Syst. 82 (2006) 50-58.

Li, D. Hilbert, S. Fuller, Numerical methods for comparing fresh and weathered oils by their FTIR speclia, Analyst 132 (2007) 792-800.

Renner, A. Nellessen, A. Schwiers, M. Wenzel, T. C. Schmidt, J. Schram, Data preprocessing & evaluation used in the microplastics identification process: A critical review & practical guide, Trends in Analytical Chemistry 111 (2019) 229-238.

Xiao-Li, L. Jing-Yan, C. Pu, X. Yu-Peng, Algorithms, Strategies and Application Progress of Spectral Searching Methods, Chin J Anal Chem, 2014, 42(9), 1379-1386.

* cited by examiner

IR SPECTRA MATCHING METHODS

CROSS-REFERENCE TO RELATED APPLICATIONS

This application claims the benefit of U.S. Provisional Patent Application Ser. No. 62/815,093 filed Mar. 7, 2019, the disclosure of which is incorporated herein by reference.

BACKGROUND

Field of the Invention

This disclosure is in the field of identifying an unknown material by analyzing the Fourier-transform infrared (FTIR) spectra of the material. This disclosure is also in the field of analyzing the quality of the material utilizing FTIR spectroscopy. The material may be any kind of substance that is susceptible to spectrum analysis, including chemicals such as organic chemicals, other compounds, biological substance, or any other similar substance in any phase of matter.

Description of the Related Art

Fourier-transform infrared spectroscopy (FTIR) is a powerful technique in identification and characterization of a broad range of chemicals and materials. FTIR spectroscopy and microscopy have been widely applied in numerous areas including quality controls in industrial processes, environmental analysis, forensic investigation, and biomedical diagnostics. However, analysis of FTIR spectra poses unique challenges due to the complexity of the spectra. For example, a large number of peaks appear within the mid-IR region ($v=4000-400$ cm$^{-1}$) and the peaks in this region largely vary in absorption cross-sections and broadness. Moreover, given a pair of FTIR spectra of an identical compound, some degrees of variations are commonly observed due to various factors such as sample concentration, background noise, baseline sloping, and slight differences in the calibration settings. For these reasons, it is of significant interest to develop robust approaches for calculating spectral similarities of FTIR spectra.

Figure 1:
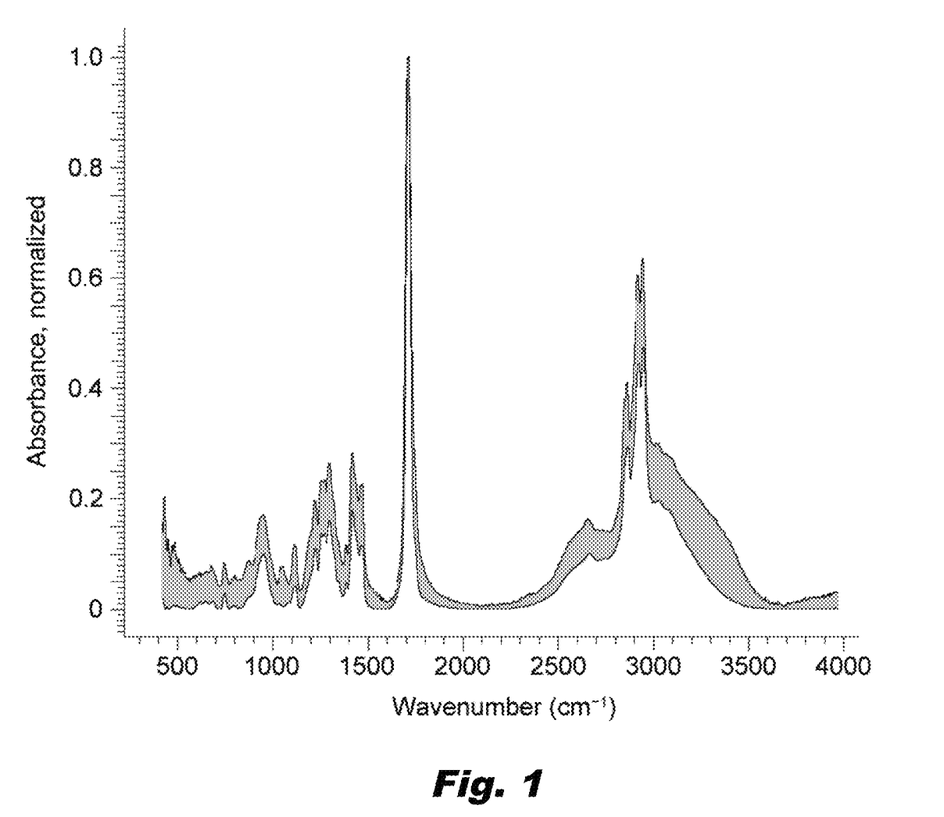
FIG. 1 is a depiction of two exemplary spectra.

To date several approaches for calculating spectral similarity have been developed and used in matching and comparison of FTIR spectra. As depicted in FIG. 1, there are two spectra for the same compound, heptanoic acid, but artifacts of the data collection process have introduced an offset between the two spectra as well as other differences of absorbance. While there are differences, the overall characteristics of the spectra (peaks and valleys) are similar.

One approach to estimate whether two spectra are for the same compound is to calculate the Spectral Similarity (SS) for the two spectra (referred to as A1 and A2) using the Euclidean distance (EUC) between the absorbance values for each wavenumber in the two spectra. An example equation for calculating SS is shown in Equation 1, where $A1_k$ and $A2_k$ are the absorbance values for two spectra at a given wavenumber k.

$$SS_{EUC} = 1 - \sqrt{\sum_k \frac{(A1_k - A2_k)^2}{\text{total length}}} \quad (1)$$

While Euclidean distance allows for the calculation of spectral similarity ($SS_{EUC}$), it is susceptible to offset and sloping of baseline as well as variations in the absolute values of absorbance. For example, the EUC approach would count the offset between the two spectra shown in FIG. 1 for an identical compound as differences even though the spectra exhibit similar characteristics. Therefore, the EUC approach requires proper scaling and/or baseline correction prior to the calculation.

The determination of spectral similarity based on correlation coefficient (COR), dot product of the absorbance vectors (DPN), and first difference of moving average (fd-MA) are other known approaches that have been reported to be more tolerant against the aforementioned problems, but these approaches tend to give more weight to larger peaks in a comparison of spectra.

The novel approach for comparing spectra utilizes a spectral similarity value calculated based on a normalized local change (NLC) value. This approach compares a given set of spectra based on the local characteristics to yield a value representing the similarity between the spectra. Embodiments of this approach reduce the bias to large peaks inherent in some methods of comparison and are tolerant to offset and baseline sloping. As a result, embodiments of the NLC approach provide improved results over other known methods of identifying an unknown spectrum. This novel method provides better results than known technology when matching two spectra with variations in the absolute values of absorbance but that exhibit similar overall spectral shapes. In this disclosure the unknown material, chemical, or compound may be referred to as a subject material, chemical, or compound, and the unknown spectrum may be referred to as a subject spectrum to be identified by the NLC method.

SUMMARY OF THE INVENTION

In various embodiments, the method identifies a subject material based upon its subject spectrum. In some of these embodiments the method includes the steps of providing a database containing a plurality of reference spectra for a plurality of reference materials, calculating a set of normalized local change values for the subject spectrum and for each reference spectrum in the plurality of reference spectra, calculating a spectral similarity value to the subject spectrum for each reference spectrum in the plurality of reference spectra in the database using the sets of normalized local change values, and identifying the reference materials with the highest spectral similarity values with respect to the subject spectrum of the subject material.

In some embodiments of the novel methods described herein, each spectrum comprises a plurality of wavenumber data values and an absorbance data value associated with each of the plurality of wavenumber values. In such methods, calculating a set of normalized local change values for a spectrum comprises calculating a normalized local change value for each of a plurality of the wavenumber values in the spectrum. In other embodiments of the novel method, the spectrum may comprise transmittance values, reflectance values, or other In some embodiments of the method, calculating a set of normalized local change values for a spectrum further comprises the steps of selecting a range value, and selecting absorbance data values to calculate each normalized local change value using the range value. The step of selecting a range value may comprise the steps of selecting at least one known spectrum associated with a first reference spectrum, calculating a spectral similarity value to at least one known spectrum for each reference spectrum in the plurality of reference spectra utilizing a plurality of range values, and selecting a range value from the plurality of range values associated with the maximum spectral similarity value for the first reference spectrum. In other embodiments of the method, alternative methods may be used to select a range value that results in the highest accuracy of the overall process by maximizing the success rate and minimizing the average hit index as described in more detail below.

In some embodiments, the step of calculating a set of normalized local change values for a spectrum further comprises the steps of selecting a floor value for the spectrum and replacing all absorbance data values in the spectrum that are less than the floor value with the floor value. In some of these methods the step of selecting a floor value for the spectrum comprises the steps of calculating an average absorbance value of the absorbance data values associated with the spectrum and multiplying the average absorbance value by a floor multiplier value. In some embodiments the floor multiplier value is determined by selecting at least one known spectrum associated with a first reference spectrum, calculating a spectral similarity value to at least one known spectrum for each of the reference spectrum in the plurality of reference spectra utilizing a plurality of floor multiplier values and selecting a floor multiplier value from the plurality of floor multiplier values associated with the minimum average hit index for the first reference spectrum. In other embodiments of the method, alternative methods may be used to select a floor value that results in the highest accuracy of the overall process by maximizing the success rate and minimizing the average hit index as described in more detail below.

In some embodiments of the method, the step of calculating a spectral similarity value to the subject spectrum for each reference spectrum comprises the steps of associating a wavenumber value from the subject spectrum with a wavenumber value from the reference spectrum, calculating a spectral difference value using the normalized local change value associated with the wavenumber value from the subject spectrum and the normalized local change value associated with the wavenumber value from the reference spectrum, and converting the spectral difference value to a spectral similarity value.

DETAILED DESCRIPTION

The normalized local change approach and embodiments of the novel method incorporates information about the variation of a spectrum in a range around each wavenumber to calculate a value, $NLC_k$, for that wavenumber. In various embodiments, the range and other parameters of the method may vary to achieve optimal performance of the method. The value of $NLC_k$ may be calculated as in Equation 2 where A is the set of absorbance values for a spectrum, $A_i$ is the absorbance value for wavenumber i, and r is the range.

$$NLC_k = \frac{R}{L+R} \text{ where } L = \sum_{i=k-r}^{k-1} A_i \text{ and } R = \sum_{i=k+1}^{k+r} A_i \quad (2)$$

Figure 2:
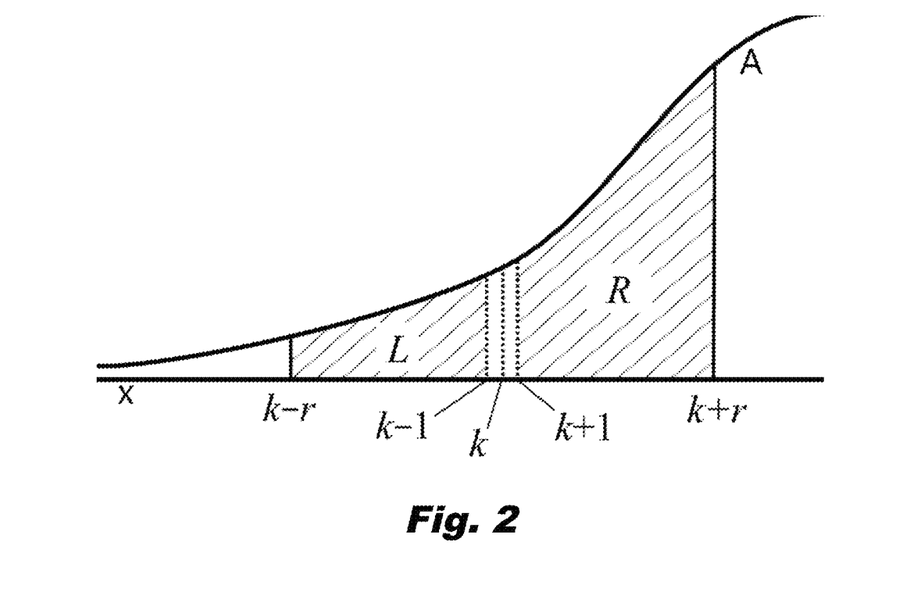
FIG. 2 is a depiction of a portion of a spectrum.

A graphical depiction of this calculation is shown in FIG. 2 for a portion of a spectrum A. The spectrum A is depicted as a continuous function, but the data collected for the spectrum is set of discrete data values corresponding to an absorbance value $A_i$ for a wavenumber k. The value of $NLC_k$ for a given wavenumber k is obtained by dividing R by L+R, where, L is the sum of the absorbance values $A_i$ where i varies over wavenumbers k−r to k and R is the sum of the absorbance values $A_i$ where i varies over wavenumbers k+1 to k+r. By varying the range r, the calculation may be adjusted to include more or less of the local features of the spectrum A. The nomenclature k±1 and k±r may represent incremental values in the data set for A, not necessarily a wavenumber equal to k plus or minus 1 or r. Thus, the wavenumber k for $A_{k+r}$ may be the $r^{th}$ value in the data set counting from the data point for $A_k$.

The value of $NLC_k$ varies between 0 and 1 because R<L+R and both L and R have non-negative values. Values of $NLC_k$ between 0 and 0.5 indicate that the absorbance A is decreasing as wavenumber increases near k, and values between 0.5 and 1 indicate that the absorbance A is increasing as wavenumber increases near k.

Once the $NLC_k$ values have been calculated for all k in a spectrum A, the Spectral Similarity ($SS_{NLC}$) may be calculated by comparing the NLC data sets for two spectra. In some embodiments of the inventive method, the spectral similarity ($SS_{NLC}$) for two spectra A1 and A2, where $SD_{NLC}$ is the spectral difference and total length is the wavenumber length of the spectra, is calculated according to Equation 3.

$$SS_{NLC} = 1 - SD_{NLC} \quad (3)$$

$$\text{where } SD_{NLC} = \frac{\sum_{k=0}^{total\ length} \left| \frac{R_{A1}}{L_{A1} + R_{A1}} - \frac{R_{A2}}{L_{A2} + R_{A2}} \right|}{total\ length} \quad (4)$$

In this embodiment $SD_{NLC}$ as shown in Equation 4 is the sum of the difference between $NLC_k(A1)$ and $NLC_k(A2)$ at each wavenumber k divided by the total wavenumber length of the spectra. In some embodiments the total length is the number of wavenumbers k for which the spectrum data set contains a value for absorbance.

When comparing two spectra, two values for $NLC_k$, one from each spectra, must be paired for the calculation of $SD_{NLC}$. Optimally, a wavenumber k will be associated with an $NLC_k$ value in both spectra. However, in some situations a wavenumber k will have an $NLC_k$ value in only one of the two spectra. In some embodiments, the $NLC_k$ value in one spectrum may be paired with an $NLC_k$ value in other spectrum with a different wavenumber k. In some embodiments, an $NLC_k$ value in the first spectrum will be paired with the $NLC_k$ value in the second spectrum with the closest wavenumber k. In some embodiments, an $NLC_k(A1)$ value for a given k1 value in a first spectrum A1 will be disregarded by the NLC method if there is no $NLC_k(A2)$ value in the second spectrum A2 for a k2 value within some proximity to k1. In some embodiments, the k2 value must be within seven wavenumbers from the k1 value for the associated $NLC_k$ values to be paired for the NLC method. In other embodiments, a narrower or wider window for matching $NLC_k$ values between spectra may be used.

In some embodiments of the NLC method, the data values in each spectrum may be padded with absorbance values of 0 for wavenumbers less than the lowest wavenumber in the spectra and for wavenumbers greater than the highest wavenumber in the spectra. In some embodiments the padded data values extend at least R wavenumbers to each side of the lowest k and highest k values in the spectrum, where R is the range used by the embodiment of the NLC method. This allows the NLC method to compare data values up to each end of the spectrum.

In some methods of identifying a material, chemical, or compound using the NLC method, a spectrum $A_U$ for an unknown compound is received by the system. This spectrum $A_U$ may be collected by an infrared spectrometer or other similar instrument. The spectrum $A_U$ is processed to create a dataset comprising $NLC_k(A_U)$ values for all or a portion of the absorbance values $A_U(k)$ in the unknown spectrum. In some embodiments a second spectrum for known reference compound $A_R$ is processed to generate a dataset comprising $NLC_k(A_R)$ values for all or a portion of the absorbance values $A_R(k)$ in the reference spectrum. The spectral difference $SD_{NLC}(A_U, A_R)$ is then calculated and converted to a value for the spectral similarity $SS_{NLC}$. This number is between 0 and 1 and higher values indicate more similarity between the two spectra.

In some embodiments a reference database is provided containing a plurality of spectra for comparison to the spectra of an unknown compound. In some embodiments, the database may contain the actual absorbance data values $A_R(k)$ for each reference compound c. In other embodiments the database may contain datasets of the processed $NLC_k(A_R)$ values for each reference compound c.

In some embodiments of the method of identifying a material, additional processing of the spectrum before calculating the NLC data values further improves the performance of the NLC method. In some embodiments a "floor" value is selected to prevent the NLC method from incorrect bias due to small peaks in the regions of the spectrum with near zero absorbance. When using the "floor" pre-processing step, the data set representing the spectrum is processed by checking each absorbance value $A_k$ in the spectrum, and if the value $A_k$ is below a floor value then the absorbance value $A_k$ is replaced with the floor value. In some embodiments of the method, the floor value F for a spectra A is determined by multiplying the average absorbance $A_k$ for a spectrum multiplied by a Floor Multiplier value.

Figure 3A:
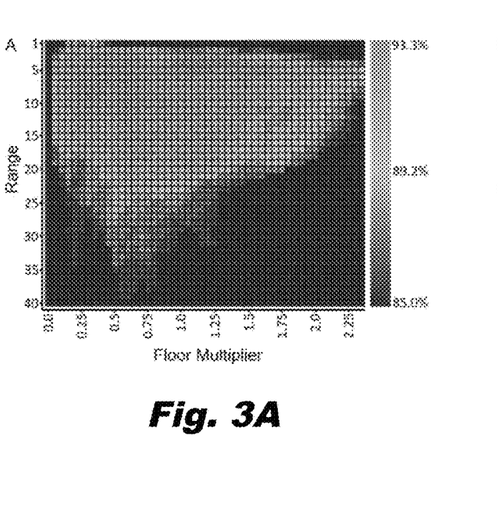
FIG. 3A depicts a heat map used for identifying optimal parameters for the inventive method.

Referring to FIG. 3A, a heat map depicts the "success rate" metric for the NLC method. The "success rate" metric may be calculated as the percentage of a set of tests where the NLC method assigns the highest $SS_{NLC}$ value to the correct spectrum in the reference database when comparing it to the known input spectrum. The results depicted in FIG. 3A for a particular embodiment of the reference database and NLC method reflect that a Range value between 4 and 14 provides the highest "success rate" metric results with less sensitivity to changes in the value of the Floor Multiplier. Other reference databases and known input spectra may result in different optimal values for the Range and Floor Multiplier.

Figure 3B:
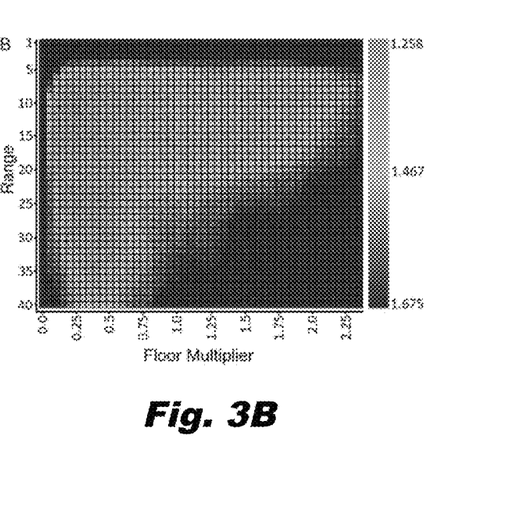
FIG. 3B depicts a heat map used for identifying optimal parameters for the inventive method.

Referring to FIG. 3B, a heat map depicts the "average hit index" metric for the NLC method. The "average hit index" metric may be calculated by finding the index ranking of the correct spectrum in the reference database for a known input spectrum processed by the NLC method. For example, if the correct spectrum from the reference database has the $2^{nd}$ highest $SS_{NLC}$ value for the known input spectrum, then the index of that test is 2. Similarly, if the correct spectrum from the reference database has the $10^{th}$ highest $SS_{NLC}$ value for the known spectrum, then the index of that test is 10. A series of tests is executed for one or more known input spectra and the index values for each test are averaged to calculate the "average hit index" metric. The results depicted in FIG. 3B reflect a greater sensitivity to the Floor Multiplier than the Range when success is determined based on the "average hit index" metric.

In some embodiments of the inventive method, the Range parameter and the Floor Multiplier parameter are set to predetermined constant values. In some embodiments of the method an analysis of success rates for the NLC method using various values of Range and Floor Multiplier is used with a known spectrum tested against a reference database to select a combination of values for those parameters that will maximize the success rate and that will minimize average hit index of the NLC method.

FIG. 3A indicates that in the depicted embodiment, the Range has greater influence on the Success Rate metric. Range values between 4 and 14 appear to give the best performance for the tested reference database and embodiment of the NLC method. Each increment of the Range widens the search width by approximately 9 $cm^{-1}$. Conversely FIG. 3B shows the Floor Multiplier is the more dominant parameter for the Average Hit Index metric for this embodiment of the reference database and NLC method. The heatmaps imply that Range is dominant for maximizing the Success Rate metric for NLC approach however, the Floor plays an important role in reducing the hit index at which the correct match is found if the NLC method fails to assign the highest $SS_{NLC}$ to the correct spectrum.

Figure 4:
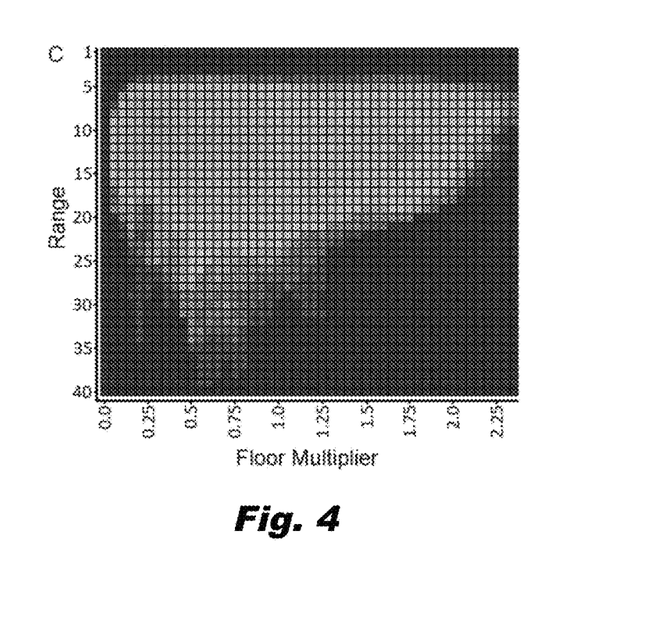
FIG. 4 depicts a heat map used for identifying optimal parameters for the inventive method.

In order to find the optimal values for the two parameters for a given embodiment, the lower performance of the two metrics for each pairing is depicted in FIG. 4. The resulting heat map identifies the sets of parameters that result in good performance of the NLC method for both metrics. In some embodiments, the optimal Floor Multiplier and Range values may also be estimated over varying numbers and selections of spectra for the reference database. In the depicted results a Range=9 (equivalent to 85.5 $cm^{-1}$ in wavenumber) and Floor Multiplier=0.3 were near to optimal selections. In other embodiments, a larger or smaller range value may be used to maximize success rate and minimize average hit index.

In FIG. 3A, red pixels indicate low success rates and green pixels indicate higher success rates. The success rate for all green pixels is higher than the COR and DPN methods of spectrum analysis. The test results described herein were generated using a database d of 120 Fourier-transform infrared spectroscopy (FTIR) spectrum for 60 different organic compounds. Similarly, in FIG. 3B, red pixels indicate high "average hit index" values and green pixels indicate lower "average hit index" values.

The "success rate" and "average hit index" metrics may also be used to compare the performance of the NLC method with other commonly used methods. Table 2 depicts the values of these metrics for different methods of comparison using database d.

| Method | Success Rate | Average Hit Index |
|---|---|---|
| NLC | 93.33% | 1.28 |
| COR | 89.17% | 1.47 |
| DPN | 88.33% | 1.55 |
| fd-MA | 88.33% | 2.23 |
| EUC | 83.33% | 3.03 |

Spectra may be subject to various artifacts of the data capture process, equipment calibration issues, or other factors that introduce artificial dissimilarities between the spectrum and the reference spectra. For example, a spectrum may be offset by some amount such that the spectra are similar but transposed up or down from the reference spectra for that compound. Another common artifact is baseline sloping whereby the spectrum is skewed up or down. Yet another common artifact is a shift in the wavenumber of the spectrum such that the spectrum is transposed left or right of the reference spectra for that compound. The NLC method is less sensitive to these artifacts than other methods, and this is less likely to misidentify a spectrum due to these types of artifacts.

Figure 5:
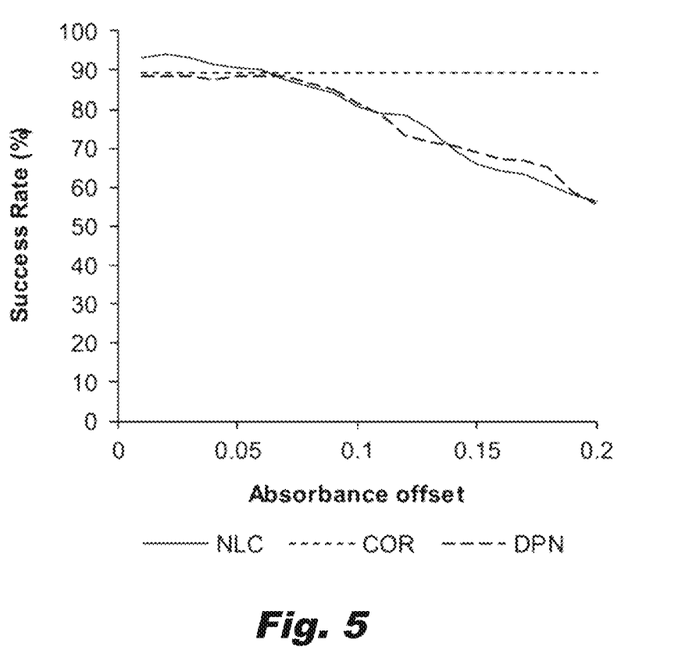
FIG. 5 is a graph of the performance of various methods of spectra comparison as affected by spectrum offset.
Figure 6:
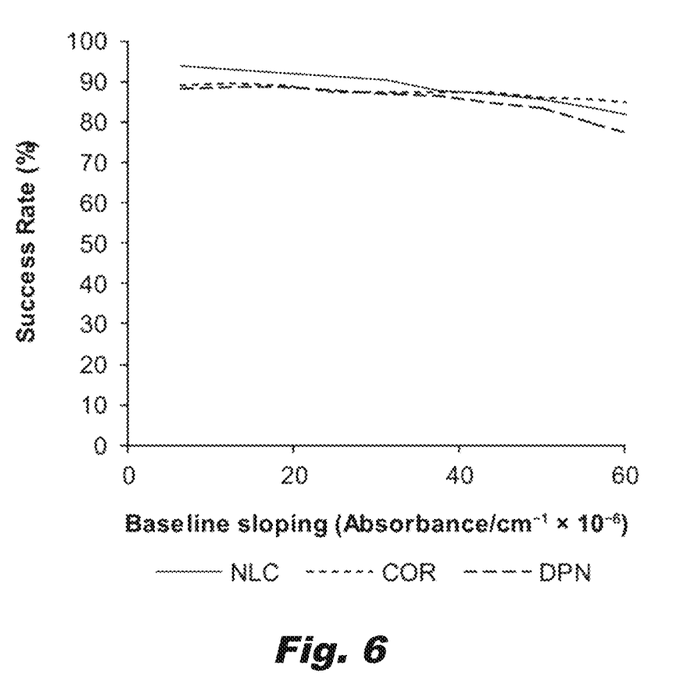
FIG. 6 is a graph of the performance of various methods of spectra comparison as affected by baseline sloping.
Figure 7:
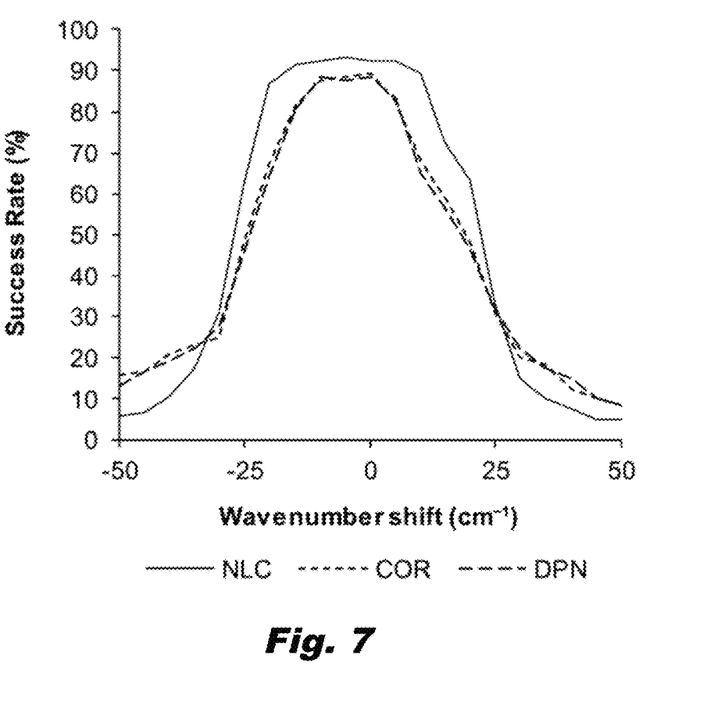
FIG. 7 is a graph of the performance of various methods of spectra comparison as affected by wavenumber shifting.

FIGS. 5, 6, and 7 depict the performance of the NLC method as compared to the COR and DPN methods when identifying a spectrum with an artificial offset, baseline sloping, and wavenumber shift, respectively. Performance of each approach was evaluated by processing a spectrum that contained the artifact and calculating the "success rate" metric.

Artifacts like baseline offset can be caused by the presence of dust on the optical parts of the spectroscopy instrument or similar issues. As shown in FIG. 5, in some embodiments the NLC method has moderate sensitivity to the baseline offset. When using the database d utilized in one embodiment, the baseline offset up to 0.03 (of normalized absorbance) has no significant effect on the "success rate" metric. As compared to the COR and DPN methods, the NLC method had superior or comparable performance as long as the offset was below 0.06 and for greater offset the NLC method is less successful. The DPN approach exhibits a similar trend for baseline offset. In comparison, the COR approach is not sensitive to baseline offset as it relies on the distance of each points relative to the average intensity for the entire spectrum.

Referring now to FIG. 6, the effect of baseline sloping on the performance of NLC, COR, and DPN comparison methods is depicted. Generally speaking, all of these methods can tolerate moderate level of baseline sloping. The NLC method using the database d chosen for one embodiment performs the best as long as the baseline sloping is below 37 absorbance (normalized) per $cm^{-1} \times 10^{-6}$ (equivalent to 0.14 of baseline sloping from 300 $cm^{-1}$ to 4000 $cm^{-1}$).

Referring now to FIG. 7, the impact of wavenumber shift on the success rate metric for an embodiment of the NLC, COR, and DPN methods is depicted. In this test, shifts along the x-axis (i.e: x-shift) are used to simulate the slight differences in the alignment/calibration setting of the spectrometers or systematic error introduced during the digitization or other processing of a spectra. In comparison to COR and DPN, this embodiment of the NLC method is more tolerant to the deviations in wavenumber axis alignment and thus is less susceptible to errors based on wavenumber shift. In depicted figure, when using database d, there was no significant change in the success rate metric for up to 8 $cm^{-1}$ in wavenumber for NLC. The NLC method's tolerance to x-shift is dependent on the selected Range value so varying embodiments of the NLC method will be more or less sensitive to the wavenumber shift. For an example, in an embodiment of the NLC method with the Range 32 9, the NLC method retained greater than 80% success rate with a shift of up to −23 $cm^{-1}$ and +13 $cm^{-1}$ of x-shifts. The NLC method is more tolerant to x-shifts compared to COR and DPN as shown by the broader width of the peak for the NLC method.

The values for Range, Floor Multiplier, and the sensitivity to offset, baseline sloping, or wavenumber shift may be different from those depicted with respect to the described embodiments. In the embodiments described herein the NLC method is used with FTIR spectra. In other embodiments the NLC method may be used with other types of spectroscopy techniques.

Figure 8A:
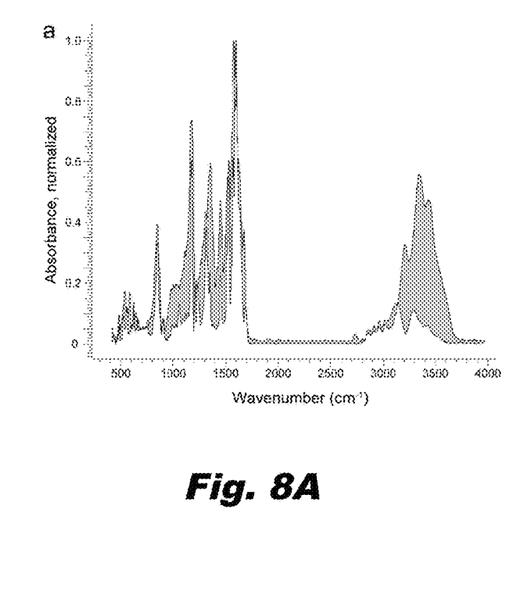
FIG. 8A is a depict of two exemplary spectra.
Figure 8B:
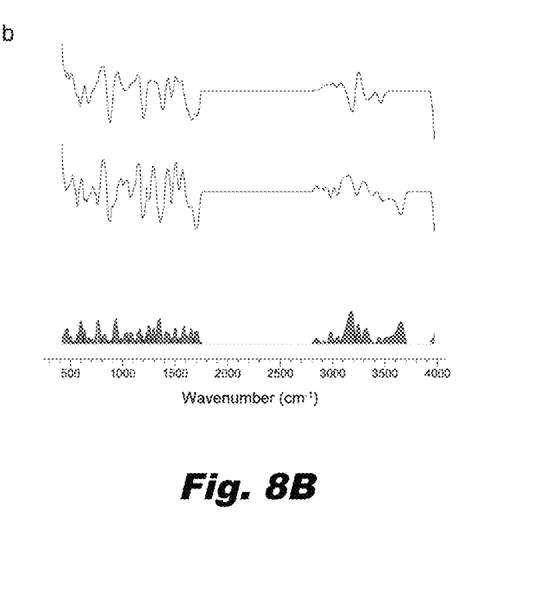
FIG. 8B is a graph of example values for data used in the inventive method as applied to the spectra of FIG. 8A.
Figure 9A:
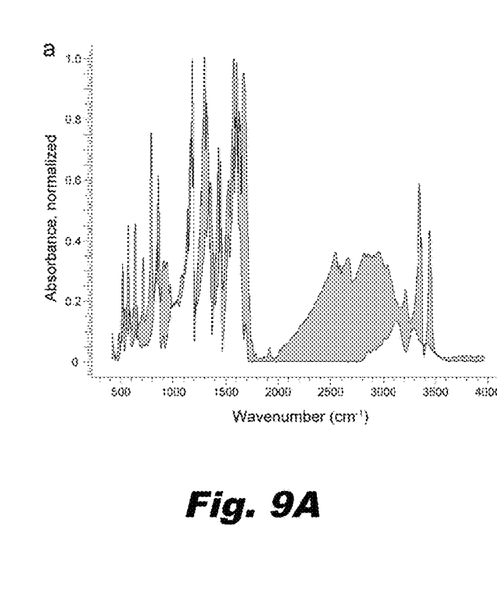
FIG. 9A is a depict of two exemplary spectra.
Figure 9B:
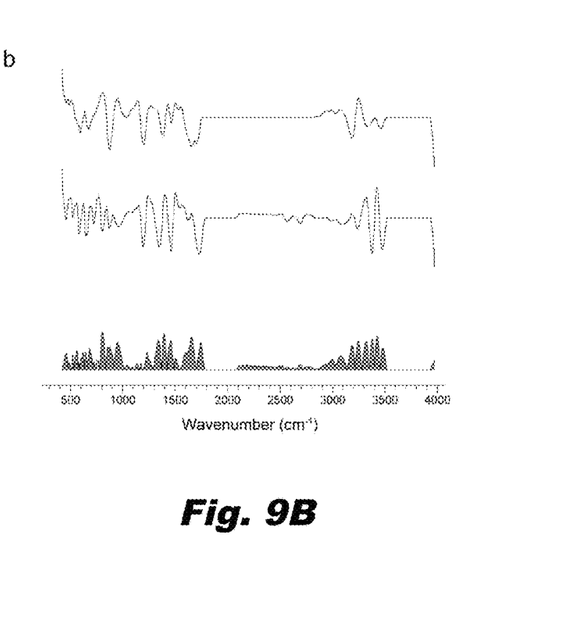
FIG. 9B is a graph of example values for data used in the inventive method as applied to the spectra of FIG. 9A.
Figure 10A:
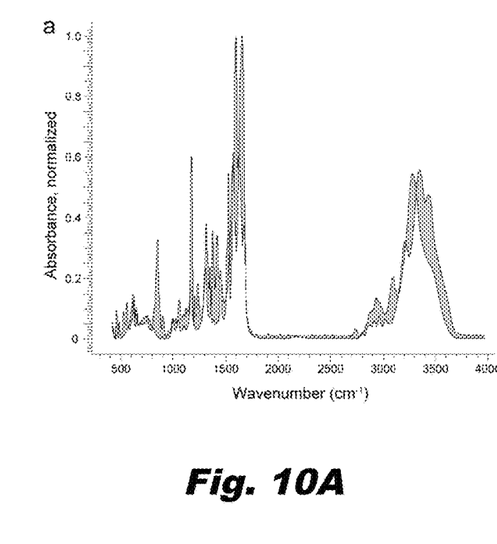
FIG. 10A is a depict of two exemplary spectra.
Figure 10B:
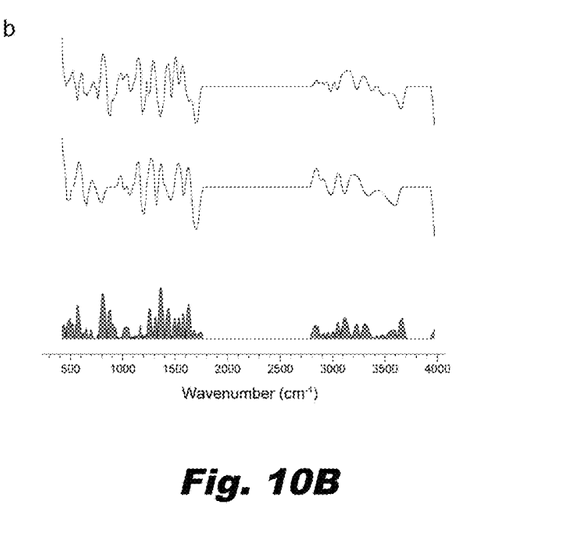
FIG. 10B is a graph of example values for data used in the inventive method as applied to the spectra of FIG. 10A.

FIGS. 8A, 9A, and 10A depict three different pairs of spectra to be compared using the NLC method. The gray areas depict the difference between the absorbance values of the spectra. FIGS. 8B, 9B, and 10B and graphically depict some of the interim steps in the NLC method of comparison. The upper line in each of the B figures depicts the values of $NLC_k$ for one of the spectra in the A figure. The middle line in each of the B figures depicts the values of $NLC_k$ for the other spectra in the A figure. The lowest line in each of the B figures depicts the absolute differences between the $NLC_k$ values for paired wavenumbers in the top and middle lines.

Referring specifically to FIGS. 8A and 8B, FIG. 8A depicts two overlaid FTIR spectra for 4-aminobenzaldehyde (556_18_3_a and 556_18_3_b). In this embodiment, the NLC method successfully matched the two spectra while both COR and DPN failed. Overall, the NLC values of those two spectra have relatively small differences compared to the other spectra in the dataset, resulting in a successful match.

Referring now to FIGS. 9A and 9B, the COR and DPN methods determined that the spectra for 4-aminobenzaldehyde, 556_18_3_a and 556_18_3_b, were closest to the spectra for 4-aminobenzoic acid (150-13-0_a) and N-methylacetamide (79-16-3_a), respectively. As shown in FIG. 9A, the spectra 556_18_3_a and 150-13-0_a exhibit different characteristics such as the presence of additional peaks around 2000-2800 $cm^{-1}$. As shown in FIG. 9B, the differences between these spectra can be easily recognized based on the absolute differences in NLC values.

FIG. 10A shows two spectra (556_18_3_b and 79_16_3_a) that are relatively similar to each other but are for different compounds (4-aminobenzaldehyde and 4-aminobenzoic acid, respectively). The NLC approach recognizes the variation in the fingerprint region (500-1500 $cm^{-1}$) based on the differences, in particular, in the NLC values around 750-950 $cm^{-1}$ and 1320-1450 $cm^{-1}$.

Overall, in comparison to the COR and DPN approaches, the NLC method considers the local characteristics of a spectrum ("range-to-range" comparison) without being influenced by the information in the rest of the spectrum. The spectra of 2-(4-isobutylphenyl)propionic acid (ibuprofen) and propionic acid are other examples where the NLC method successfully matched the spectra but the COR and DPN approaches failed. The visual comparison of these spectra suggests the capability of the NLC method to capture the spectral features such as the location and width of both large and small peaks. These characteristics suggest the suitability of the NLC method for being applied in the matching of FTIR spectra where many absorption peaks with varied absorption cross-section and peak width are observed.

In a preferred embodiment, the NLC method is embodied in special purpose software executing on a general purpose computer. In some embodiments, the NLC method may be encoded in firmware on special purpose computer hardware, or in special purpose integrated circuits or other technological processes. In some embodiments the NLC method may be incorporated into spectrometer and applied to a spectrum as the spectrum is captured by the spectrometer.

Changes may be made in the above methods, devices and structures without departing from the scope hereof. Many different arrangements of the various components depicted, as well as components not shown, are possible without departing from the spirit and scope of the present invention. Embodiments of the present invention have been described with the intent to be illustrative and exemplary of the invention, rather than restrictive or limiting of the scope thereof. Alternative embodiments will become apparent to those skilled in the art that do not depart from its scope. Specific structural and functional details disclosed herein are not to be interpreted as limiting, but merely as a representative basis for teaching one of skill in the art to employ the present invention in any appropriately detailed structure. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A method for identifying a subject material having a subject spectrum, the method comprising:
    obtaining the subject spectrum for the subject material by measuring spectral data associated with the subject material;
    obtaining from a database spectral information associated with a plurality of reference spectra for a plurality of reference materials;
    calculating a final set of normalized local change values for the subject spectrum by:
        determining a set of ranges for each discrete wavenumber value of a plurality of discrete wavenumber values, each set of ranges including an upper wavenumber range and a lower wavenumber range;
        determining for each discrete wavenumber value a sum of absorbance data values of respective upper and lower wavenumber ranges; and
        calculating for each discrete wavenumber value a normalized local change value by dividing the sum of the absorbance data values of the respective upper wavenumber range by the sum of the absorbance data values of the respective upper and lower wavenumber ranges,
        wherein each upper wavenumber range extends between respective first and second upper wavenumber values, each of the first and second upper wavenumber values being higher than the respective discrete wavenumber value,
        wherein each lower wavenumber range extends between respective first and second lower wavenumber values, each of the first and second lower wavenumber values being lower than the respective discrete wavenumber value;
    calculating a final spectral similarity value for each reference spectrum in the plurality of reference spectra by comparing a final set of normalized local change values for each reference spectrum with the final set of normalized local change values for the subject spectrum;
    comparing the final spectral similarity values to determine a highest spectral similarity value; and
    identifying the subject material as the reference material associated with the highest final spectral similarity value,
    wherein each normalized local change value of each final set of normalized local change values is between zero and one.

2. The method of claim 1, wherein each first upper wavenumber value is one unit greater than its respective discrete wavenumber value of the plurality of discrete wavenumber values, wherein each second upper wavenumber value is at least one unit greater than its respective first upper wavenumber value, wherein each second lower wavenumber value is one unit less than its respective discrete wavenumber value of the plurality of discrete wavenumber values, and wherein each first lower wavenumber value is at least one unit less than its respective second lower wavenumber value.

3. The method of claim 1, wherein the step of calculating the final set of normalized local change values for the subject spectrum further comprises:
    selecting an optimized range value; and
    using the optimized range value to determine for each of the plurality of discrete wavenumber values respective first and second lower wavenumber values and respective first and second upper wavenumber values.

4. The method of claim 3, further comprising determining the optimized range value, wherein determining the optimized range value comprises:
    selecting a first reference spectrum of the plurality of reference spectra, the first reference spectrum being a first optimizing spectrum;
    calculating a first set of normalized local change values for the first optimizing spectrum;
    calculating a first spectral similarity value for each of the reference spectrum in the plurality of reference spectra by comparing a first set of normalized local change values for each reference spectrum with the first set of normalized local change values for the first optimizing spectrum, wherein each normalized local change value associated with each first set of normalized local changes values is calculated using a first range value;
    calculating a plurality of subsequent spectral similarity values utilizing a plurality of subsequent range values; and
    calculating a success rate and an average hit index for the first range value and for each of the plurality of subsequent range values.

5. The method of claim 1, wherein the step of calculating the final set of normalized local change values for the subject spectrum further comprises:
    determining an optimized floor value; and
    replacing all absorbance data values in the subject spectrum that are less than the optimized floor value with the optimized floor value.

6. The method of claim 5, wherein determining the optimized floor value comprises:
- calculating an average absorbance value of the absorbance data values associated with the subject spectrum; and
- multiplying the average absorbance value by an optimized floor multiplier value.

7. The method of claim 6, wherein the optimized floor multiplier value is determined by:
- selecting a first reference spectrum of the plurality of reference spectra, the first reference spectrum being a first optimizing spectrum;
- calculating a first spectral similarity value for each reference spectrum in the plurality of reference spectra by comparing a first set of normalized local change values for each reference spectrum with a first set of normalized local change values for the first optimizing spectrum, wherein each normalized local change value associated with each first set of normalized local changes values is calculated using a first floor multiplier value;
- calculating a plurality of subsequent spectral similarity values utilizing a plurality of subsequent floor multiplier values; and
- calculating a success rate and an average hit index for the first floor multiplier value and for each of the plurality of subsequent floor multiplier.

8. The method of claim 1, wherein calculating the final spectral similarity value for each reference spectrum comprises:
- associating a first wavenumber value from the subject spectrum with a first wavenumber value from a first reference spectrum of the plurality of reference spectrum; and
- calculating a first spectral similarity value using a first normalized local change value associated with the first wavenumber value from the subject spectrum and a first normalized local change value associated with the first wavenumber value from the first reference spectrum.

9. The method of claim 8, wherein associating the first wavenumber value from the subject spectrum with the first wavenumber value from the first reference spectrum comprises:
- selecting the closest wavenumber values from the subject spectrum and the reference spectrum that are associated with an absorbance value; and
- associating the selected closest wavenumber values.

10. The method of claim 9, wherein the wavenumber values are selected only if the difference between the wavenumber values is less than or equal to a predetermined maximum difference value.

11. The method of claim 8, further comprising repeating the step of associating a wavenumber value for a plurality of wavenumbers in the reference spectrum.

12. A method for identifying a reference spectrum for an unknown subject spectrum from among a plurality of reference spectra, the subject spectrum and each reference spectrum comprising a plurality of discrete wavenumber values, each discrete wavenumber value being associated with respective upper and lower wavenumber ranges, each range being associated with a plurality of absorbance values, the method comprising:
- obtaining the subject spectrum by measuring spectral data associated with a subject material;
- calculating a final set of normalized local change values for the subject spectrum;
- calculating a final set of normalized local change values for each reference spectrum in the plurality of reference spectra;
- calculating a final spectral similarity value for each reference spectrum using the final set of normalized local change values for the subject spectrum and the final set of normalized local change values for the relevant reference spectrum;
- identifying a maximum final spectral similarity value of the calculated final spectral similarity values; and
- identifying the reference spectrum for the unknown subject spectrum as the reference spectrum associated with the maximum spectral similarity value,
- wherein calculating the final set of normalized local change values for the subject spectrum comprises:
  - determining for each discrete wavenumber value sums of absorbance values within respective upper and lower wavenumber ranges, wherein each upper wavenumber range consists of absorbance values for wavenumber values that are higher than the respective discrete wavenumber value, and wherein each lower wavenumber range consists of absorbance values for wavenumber values that are lower than the respective discrete wavenumber value; and
  - calculating for each discrete wavenumber value a normalized local change value by dividing the sum of the absorbance values of the respective upper wavenumber range by the sum of the absorbance values of the respective upper and lower wavenumber ranges.

13. The method of claim 12, wherein calculating the normalized local change value for each discrete wavenumber value further comprises:
- selecting an optimized range value; and selecting an optimized floor multiplier value; and
- using the optimized range value to determine upper and lower bounds for each upper and lower wavenumber range.

14. The method of claim 12 wherein the step of calculating a spectral similarity for a reference spectrum and the subject spectrum further comprises pairing a target wavenumber from the set of normalized local change values for the reference spectrum with a target wavenumber from the set of normalized local change values for the subject spectrum.

15. The method of claim 14 wherein the step of calculating a spectral similarity for a reference spectrum and the subject spectrum further comprises calculating a spectral difference value based on the absorbance value for the paired target wavenumbers from the reference spectrum and the subject spectrum.

16. The method of claim 12, further comprising repeating the step of associating a wavenumber value for a plurality of wavenumbers in the reference spectrum.

17. The method of claim 12, wherein each upper wavenumber range extends between first and second upper wavenumber values, the first upper wavenumber value being one unit greater than the respective discrete wavenumber and the second upper wavenumber value being at least one unit greater than first upper wavenumber value, and wherein each lower wavenumber range extends between first and second lower wavenumber values, the second lower wavenumber value being one unit less than the respective discrete wavenumber and the first lower wavenumber value being at least one unit less than the second lower wavenumber value.

* * * * *

UNITED STATES PATENT AND TRADEMARK OFFICE
CERTIFICATE OF CORRECTION

PATENT NO. : 11,726,034 B2
APPLICATION NO. : 16/811680
DATED : August 15, 2023
INVENTOR(S) : Iqbal et al.

It is certified that error appears in the above-identified patent and that said Letters Patent is hereby corrected as shown below:

On the Title Page

Column 2, item (74), in "Attorney, Agent, or Firm", Line 1, delete "Kulak" and insert -- Kutak --, therefor.

On Page 2, Column 2, item (56), under "OTHER PUBLICATIONS", Line 8, delete "speclia," and insert -- spectra, --, therefor.

In the Specification

In Column 8, Line 11, delete "Range 32 9," and insert -- Range=9, --, therefor.

Signed and Sealed this
Twenty-fourth Day of October, 2023

Katherine Kelly Vidal
Director of the United States Patent and Trademark Office